US008730046B2

(12) United States Patent
Strassburger et al.

(10) Patent No.: US 8,730,046 B2
(45) Date of Patent: May 20, 2014

(54) EAS INTEGRATED FAUCET TAG ASSEMBLY

(75) Inventors: Jake Strassburger, South Plainfield, NJ (US); Alex Tetiyevsky, Springfield, NJ (US); Michael Norman, East Brunswick, NJ (US)

(73) Assignee: B&G Plastics, Inc., Newark, NJ (US)

( * ) Notice: Subject to any disclaimer, the term of this patent is extended or adjusted under 35 U.S.C. 154(b) by 148 days.

(21) Appl. No.: 13/246,939

(22) Filed: Sep. 28, 2011

(65) Prior Publication Data

US 2012/0105231 A1 May 3, 2012

Related U.S. Application Data

(60) Provisional application No. 61/388,885, filed on Oct. 1, 2010.

(51) Int. Cl.
*G08B 13/14* (2006.01)
*G06K 15/00* (2006.01)

(52) U.S. Cl.
USPC ........................................ 340/572.8; 235/383

(58) Field of Classification Search
USPC ......... 235/492; 285/243; 70/57.1; 340/572.8, 340/572.1
See application file for complete search history.

(56) References Cited

U.S. PATENT DOCUMENTS

| | | | | |
|---|---|---|---|---|
| 3,685,676 A | | 8/1972 | Gach et al. | |
| 3,756,444 A | | 9/1973 | McIntosh | |
| 3,853,236 A | | 12/1974 | Ostrowsky | |
| 3,902,339 A | | 9/1975 | Carley et al. | |
| 3,915,326 A | | 10/1975 | Hrubesky | |
| 4,018,640 A | | 4/1977 | Amberg | |
| 4,089,463 A | | 5/1978 | Babiol | |
| 4,176,756 A | | 12/1979 | Gellman | |
| 4,241,188 A | | 12/1980 | Materia et al. | |
| 4,405,161 A | | 9/1983 | Young et al. | |
| 4,457,445 A | | 7/1984 | Hanks et al. | |
| 4,471,982 A | | 9/1984 | Nielsen, Jr. | |
| 4,674,778 A | | 6/1987 | Ruiz | |
| 4,712,680 A | * | 12/1987 | Panazzolo | 206/427 |
| 4,729,487 A | | 3/1988 | Wright | |
| 4,813,564 A | | 3/1989 | Cooper et al. | |
| 5,020,725 A | * | 6/1991 | Waldrum | 239/154 |
| 5,230,541 A | | 7/1993 | Nowak | |

(Continued)

FOREIGN PATENT DOCUMENTS

| | | |
|---|---|---|
| GB | 2465892 A | 6/2010 |
| WO | 2007/086984 A1 | 8/2007 |
| WO | 2008/075310 | 6/2008 |

*Primary Examiner* — Hai Phan
*Assistant Examiner* — Royit Yu
(74) *Attorney, Agent, or Firm* — Hoffmann & Baron, LLP

(57) ABSTRACT

A tag assembly for a faucet that includes a housing, a cover and an electronic article surveillance tag. The housing has a base plate with a top side, a bottom side and a perimeter, an internal wall defining a first section and a second section on the bottom side and an outer perimetrical side wall. The first section has an opening in the base plate defined by an inner perimetrical side wall. One or more flexible members extend into the opening from the inner perimetrical side wall. The second section has a compartment for an electronic article surveillance tag enclosed by the cover and bounded by the internal wall and the outer perimetrical side wall. The threaded pipe on a faucet is inserted in the opening of the tag assembly housing and the flexible members engage the threads to secure the tag assembly.

20 Claims, 7 Drawing Sheets

(56) References Cited

U.S. PATENT DOCUMENTS 5,487,464 A * 1/1996 Galbierz et al. .............. 206/149
D371,510 S * 7/1996 Marsh ............................ D9/752
5,602,530 A 2/1997 Holmgren
5,667,085 A 9/1997 Ogden et al.
5,884,757 A * 3/1999 Prince ........................... 206/153
5,986,562 A * 11/1999 Nikolich .................... 340/693.5
6,050,399 A * 4/2000 Pratt ............................. 206/158
6,098,256 A 8/2000 Poussard
6,137,413 A 10/2000 Ryan, Jr.
6,254,139 B1 7/2001 Fresnel
6,342,838 B1 1/2002 Kolton et al.
6,604,643 B1 8/2003 Michael et al.
6,696,955 B2 2/2004 Kolton et al.
6,724,309 B2 * 4/2004 Grose et al. ................ 340/572.1
6,831,552 B2 12/2004 Lin
D506,694 S 6/2005 Corney
6,933,847 B2 8/2005 Feibelman
7,048,179 B2 5/2006 Claessens et al.
7,061,382 B2 6/2006 Claessens et al.
7,129,841 B2 10/2006 Feibelman
7,185,399 B2 3/2007 Logan
7,394,383 B2 7/2008 Hager et al.
7,533,826 B2 * 5/2009 Phillips ......................... 235/486
7,650,768 B2 1/2010 Fawcett et al.
7,686,346 B1 * 3/2010 Buccicone et al. ...... 285/133.21
7,804,405 B2 9/2010 Norman et al.
7,808,390 B2 10/2010 Sayegh
8,158,884 B2 * 4/2012 de la Borbolla ................ 174/54
8,203,453 B2 * 6/2012 Mosteller ................... 340/572.1
8,267,326 B2 * 9/2012 Kolton et al. ................. 235/492
2005/0230110 A1 * 10/2005 Ellison et al. .............. 166/255.1
2006/0076419 A1 * 4/2006 Johnson ........................ 235/492
2006/0151414 A1 7/2006 Mullen
2007/0062903 A1 3/2007 Norman et al.
2007/0234524 A1 10/2007 Witt
2007/0285243 A1 12/2007 Feibelman
2008/0030334 A1 2/2008 Marsilio et al.
2008/0048868 A1 2/2008 Chua et al.
2008/0230509 A1 9/2008 Koo et al.
2008/0236209 A1 * 10/2008 Conti et al. ....................... 70/18
2008/0284163 A1 * 11/2008 Proulx et al. .................. 285/243
2008/0289372 A1 * 11/2008 Rendon et al. ................. 70/57.1
2010/0079284 A1 * 4/2010 Perez et al. ................ 340/568.1
2010/0085191 A1 4/2010 Kolton et al.
2010/0089105 A1 4/2010 Fawcett et al.
2010/0133224 A1 6/2010 Kolton et al.
2010/0213263 A1 * 8/2010 Ho et al. ....................... 235/487
2010/0219954 A1 * 9/2010 Zinner ....................... 340/572.8
2010/0253524 A1 * 10/2010 Kolton et al. .............. 340/572.9
2011/0006896 A1 * 1/2011 Barnett et al. ................ 340/565
2011/0074583 A1 * 3/2011 Kolton et al. .............. 340/572.8

* cited by examiner

EAS INTEGRATED FAUCET TAG ASSEMBLY

This application claims priority from provisional application Ser. No. 61/388,885, filed on Oct. 1, 2010, which is incorporated herein in its entirety.

FIELD OF THE INVENTION

The present invention relates generally to tags attached to fixtures. More particularly, the present invention relates to a tag assembly with an electronic tag that may be attached to plumbing fixtures to provide security and identification.

BACKGROUND OF INVENTION

Tags with electronic identification devices have been attached to articles and have a wide variety of uses, including tracking, inventory control and security. These devices can also provide electronically readable information pertaining to the articles. These tags or markers may include radio frequency identification ("RFID") tags or electronic article surveillance ("EAS") tags. The term "EAS tags" is used collectively herein to refer to RFID tags, EAS tags and any other electronic devices that are used with merchandise for security and anti-theft purposes. EAS tags attached to articles may be used with an alarm system to provide theft deterrence by monitoring the location of the tags and any unauthorized movement of the article containing the electronic tag from a predetermined area. The tags can be enclosed in or attached to a variety of different devices, such as holders or housings, which accommodate the electronic tag and are used to attach the tags to articles. The tags are secured to the article so that they remain with the article until after the time of purchase.

With respect to some articles, such as plumbing fixtures, various security tags have been attached to different locations on the packaging. However, most of these tags can be easily removed by a thief and do not provide adequate security protection. Because these plumbing fixtures can cost hundreds of dollars, there is a need for a security device that can be attached to the fixtures without damaging them and that cannot be easily removed by a thief.

SUMMARY OF THE INVENTION

In accordance with the present invention, an electronic article surveillance ("EAS") integrated faucet tag assembly for attachment to a threaded pipe on a faucet is provided. The tag assembly includes: a housing, a cover and an electronic article surveillance tag. The housing has a base plate with a top side, a bottom side and a perimeter, an internal wall and an outer perimetrical side wall. The outer perimetrical side wall extends from the perimeter of the bottom side to define an enclosed area with an open side. The bottom side of the base plate has a first section and a second section separated by the internal wall. The outer perimetrical side wall can be formed by two side walls and two end walls so that the internal wall is substantially parallel to at least one of the two end walls. A portion of each side wall bounding the first section can be concave to facilitate gripping and rotating the housing. The tag can be constructed from a plastic material, preferably polypropylene, polyethylene or polyvinyl chloride.

The first section has an opening in the base plate defined by an inner perimetrical side wall that extends from the bottom side to a perimetrical edge. Preferably, the opening in the base plate is substantially round or substantially oval in shape. However, it is contemplated that the opening can have other shapes that allow it to enclose a pipe. One or more members extend into the opening from the inner perimetrical side wall. The members can be flexible and each member has a base located on the inner perimetrical side wall and a distal end. Preferably, the base of each flexible member has a first thickness and the distal end has a second thickness. The first thickness is preferably greater than the second thickness and the distal end is preferably arcuate.

The second section has a compartment bounded by the internal wall and the outer perimetrical side wall. The compartment has a cover, which has a closed position that encloses the compartment and an open position that allows access to the compartment. Preferably, the cover includes a substantially flat top wall with a perimeter and a perimetrical side wall extending therefrom. The cover can also include one or more flexible mounting clips located on the perimeter of the top wall or on the perimetrical side wall and the internal wall and/or the outer perimetrical side wall can include one or more mating devices. The one or more flexible mounting clips can engage the one or more mating devices to secure the cover to the housing.

The electronic article surveillance tag is located in the compartment and it allows the article, to which the tag assembly is attached, to be electronically identified for security and inventory tracking. When used with a faucet, the threaded pipe is inserted in the opening of the tag assembly housing from the bottom side and the distal ends of the one or more members engage the threads of the pipe as the housing is rotated to secure the tag assembly to the faucet.

BRIEF DESCRIPTION OF THE FIGURES

The preferred embodiments of the EAS integrated faucet tag assembly, as well as other objects, features and advantages of this invention, will be apparent from the accompanying drawings wherein.

DETAILED DESCRIPTION OF THE INVENTION

The electronic article surveillance ("EAS") integrated faucet tag assembly is attached to a threaded pipe on a faucet to provide security from theft and to facilitate identification of the faucet for inventory purposes. The tag assembly includes a housing that can be securely attached to a threaded pipe on a faucet and an EAS tag that allows monitoring of the location of the faucet and prevents unauthorized removal. The tag assembly is constructed from a plastic material, such as polypropylene, polyethylene or polyvinyl chloride. The housing has a top side, a bottom side and an outer perimetrical side wall extending from the bottom side. The outer perimetrical side wall forms an enclosed area with two sections separated by an internal wall. The first section has a substantially round or oval opening with one or more flexible members extending inwardly from the edges to an arcuate distal end. The arcuate distal ends are designed for snugly threading the housing onto a threaded pipe so that the housing cannot be easily removed except by unthreading. The second section has a compartment bounded by the internal wall on one side and the outer perimetrical side wall on the other three sides. The compartment has a detachable cover. An EAS device can be installed in the compartment to provide electronic monitoring and theft protection.

The tag assembly is attached to a faucet by inserting one of the threaded pipes of the faucet through the opening of the housing from the bottom side of the housing. The flexible members can extend upwardly towards the top side of the housing so that, when the pipe is inserted in the opening, the flexible members are pushed back and allow the pipe to pass through the opening. However, after the tag assembly is positioned on the faucet, the flexible members engage the threads and secure the tag assembly to the faucet. The upwardly extending flexible members are positioned in the threads and prevent the tag assembly from being pulled off the pipe. In order to remove the tag assembly, the housing has to be rotated, i.e., "unscrewed" from the pipe. This requires more time and acts as a theft deterrent.

Figure 2:
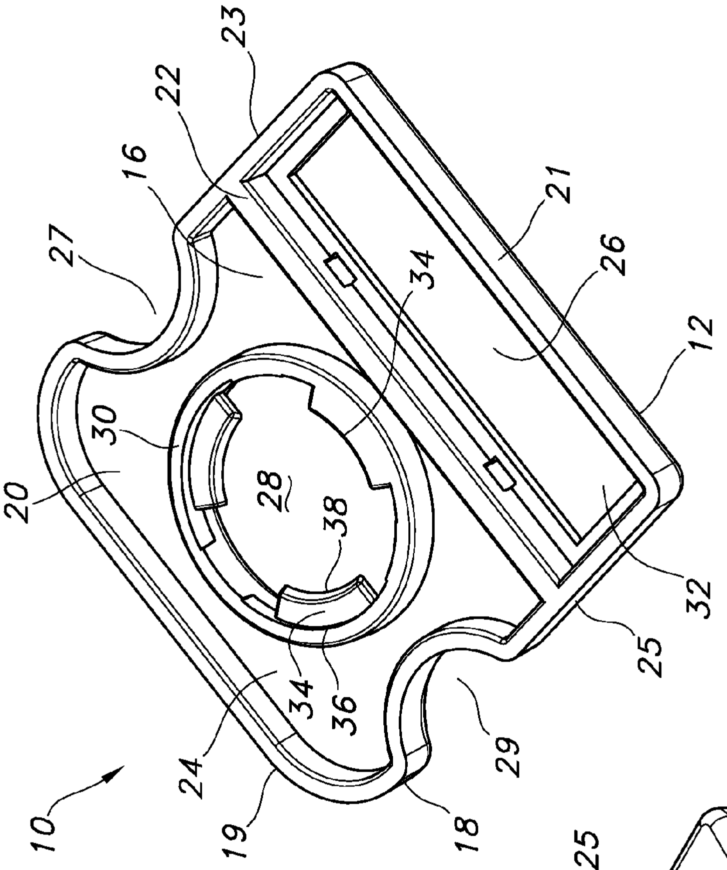
FIG. 2 is a bottom perspective view of the EAS integrated faucet tag assembly shown in FIG. 1.
Figure 1:
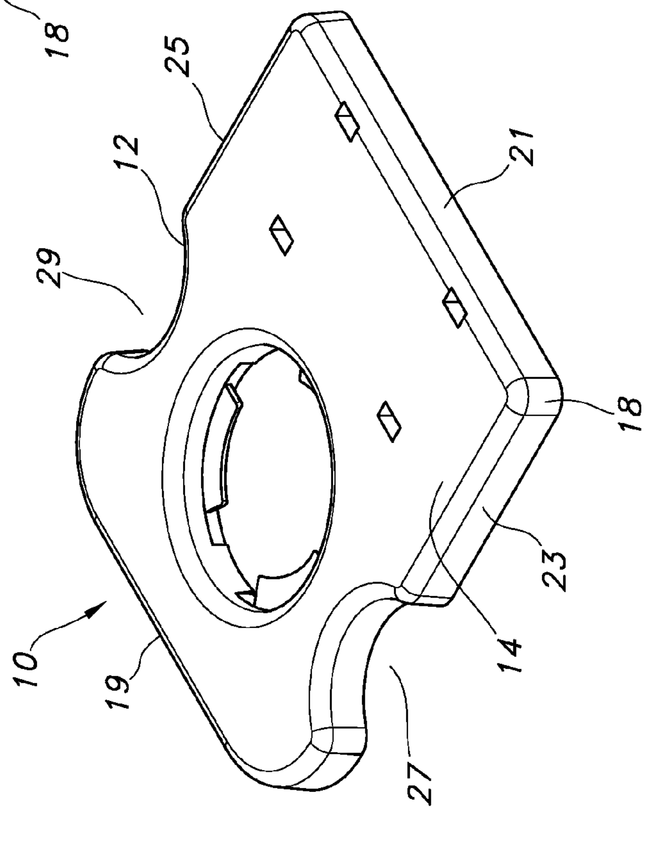
FIG. 1 is a top perspective view of the EAS integrated faucet tag assembly of the present invention.

The EAS integrated faucet tag assembly is described in more detailed with respect to the drawings. FIGS. 1 and 2 show the tag assembly 10 having a housing 12 that includes a base plate 13 with a top side 14 and a bottom side 16. An outer perimetrical side wall 18 extends from the bottom side 16 of the base plate 13 to define an enclosed area 20. The outer perimetrical side wall 18 can include a pair of end walls 19, 21 and a pair of opposing side walls 23, 25. The opposing side walls 23, 25 can have concave portions 27, 29 that facilitate gripping and rotating the housing 12. The bottom side 16 is separated by an internal wall 22 into a first section 24 and a second section 26. The first section 24 has an opening 28 defined by an inner perimetrical side wall 30, which extends from the bottom side 16 of the base plate 13, i.e., in the same direction as the outer perimetrical side wall 18. The second section 26 has a compartment 32 bounded by the internal wall 22 on one side and the outer perimetrical side wall 18 on the other three sides.

Figure 18:
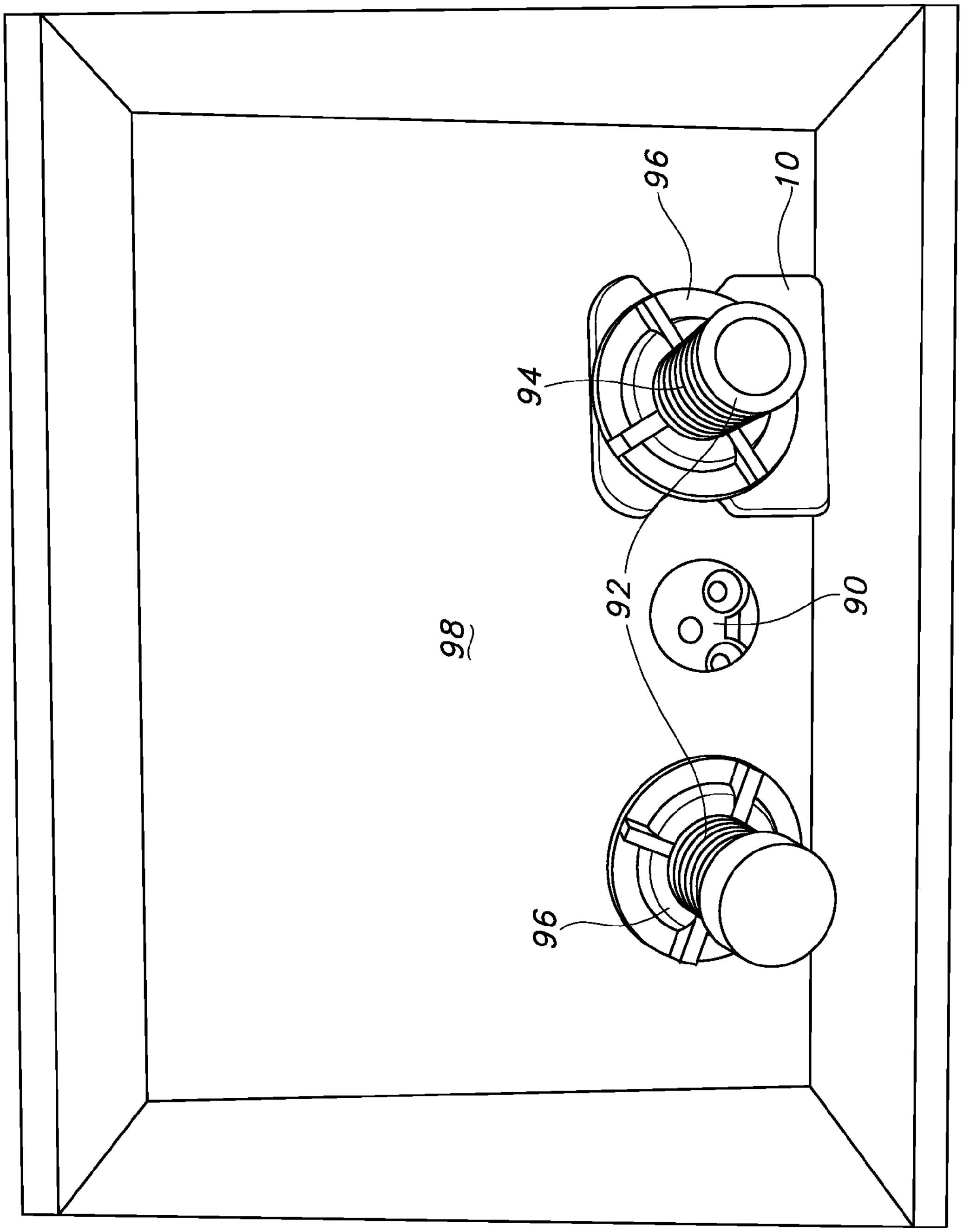
FIG. 18 shows the EAS integrated faucet tag assembly of the present invention attached to the threaded pipe of a faucet packaged in a box.
Figure 19:
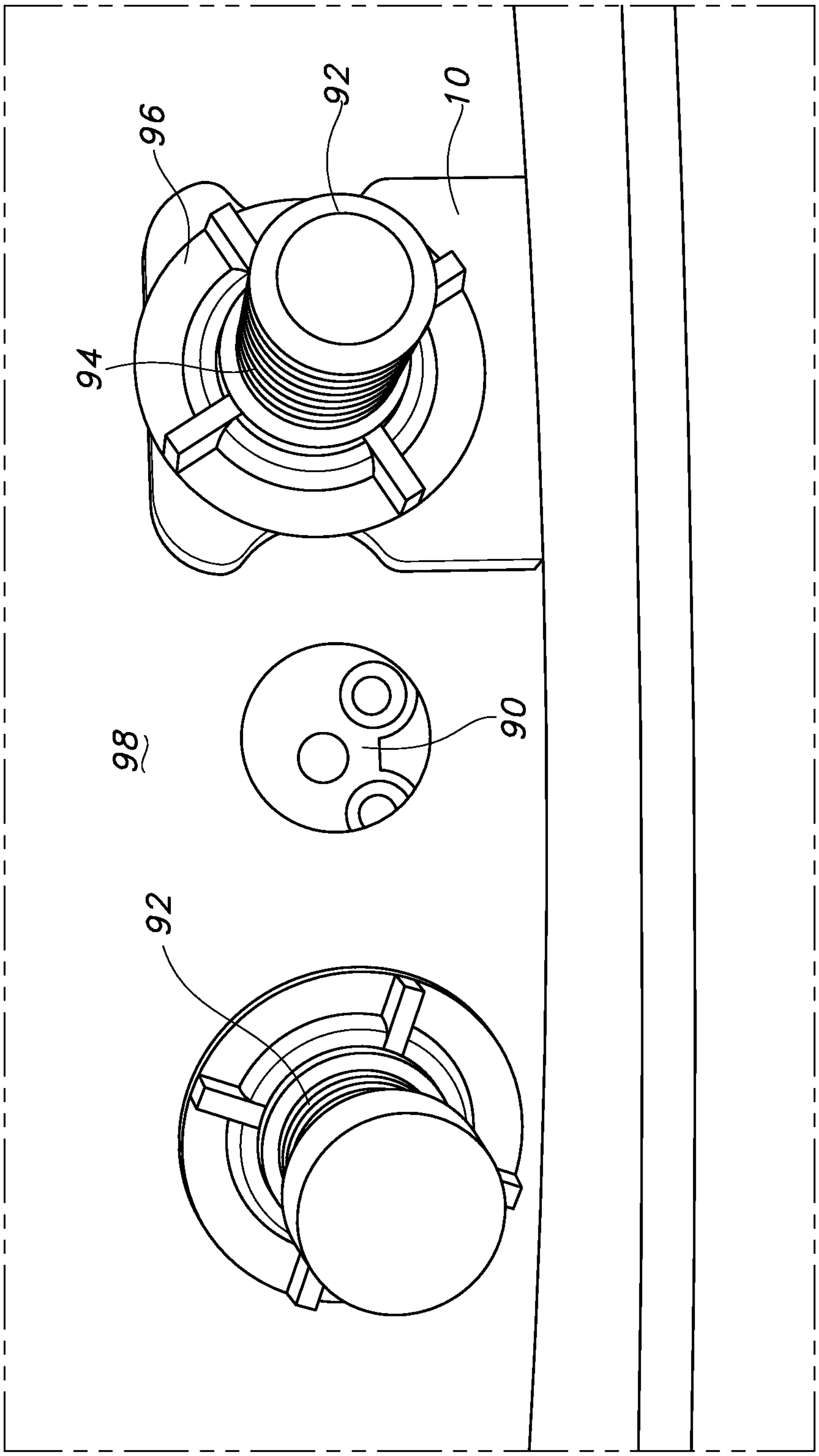
FIG. 19 is a close-up view of the EAS integrated faucet tag assembly shown in FIG. 18.
Figure 20:
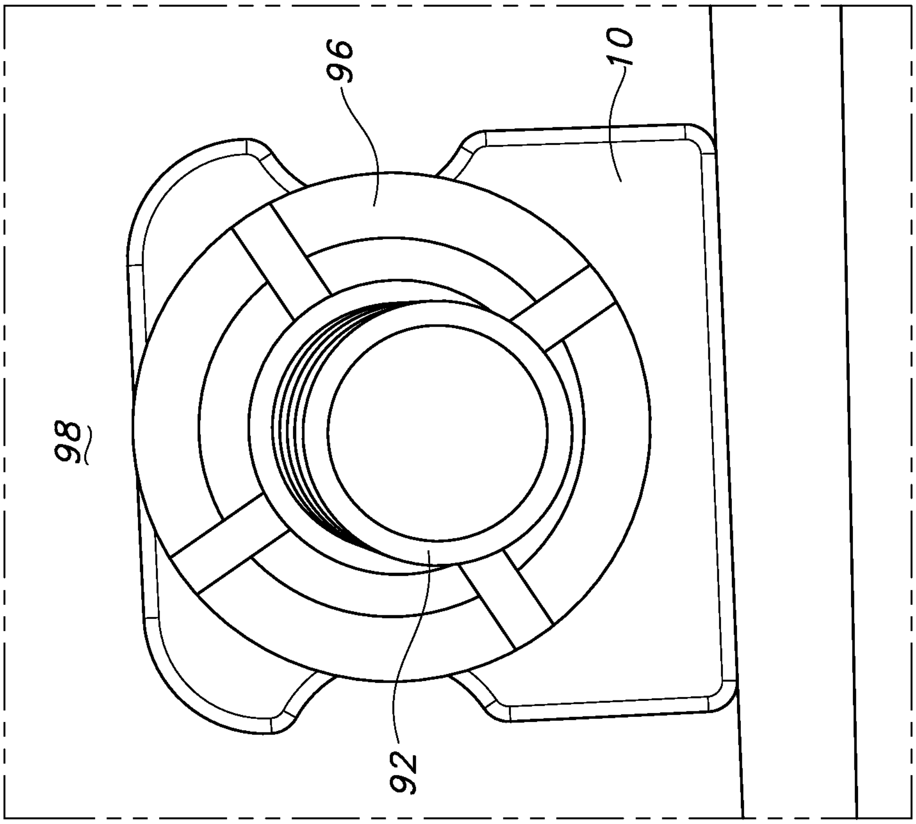
FIG. 20 is a close-up view of the EAS integrated faucet tag assembly shown in FIG. 18.

One or more flexible members 34 extend inwardly from the inner perimetrical side wall 30. Each of the one or more flexible members 34 has a base 36 located on the inner perimetrical side wall 30 and an arcuate distal end 38. The arcuate distal end 38 is adapted to engage the threads 94 on the outer side of one of the pipes 92 of a faucet 90 (FIGS. 18-20). When the housing 12 is threaded onto the pipe 92, the flexible members 34 prevent the tag assembly 10 from being pulled off the pipe 92. In order to remove the tag assembly 10, a thief would have to rotate the housing 12 and "unscrew" it from the pipe 92. This takes time and makes it more difficult for the thief to steal the faucet 90 without being detected.

Figure 6:
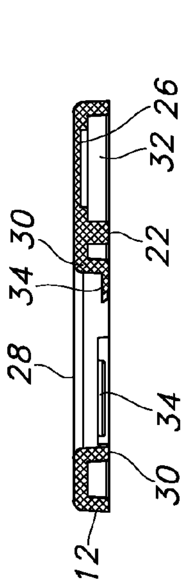
FIG. 6 is a cross-sectional view of section A-A of the housing for the EAS integrated faucet tag assembly shown in FIG. 3.
Figure 7:
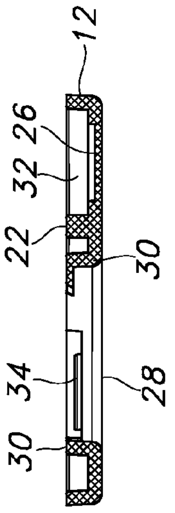
FIG. 7 is a cross-sectional view of section B-B of the housing for the EAS integrated faucet tag assembly shown in FIG. 5.
Figure 8:
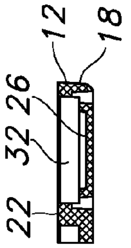
FIG. 8 is a cross-sectional view of section C-C of the housing for the EAS integrated faucet tag assembly shown in FIG. 5.
Figure 3:
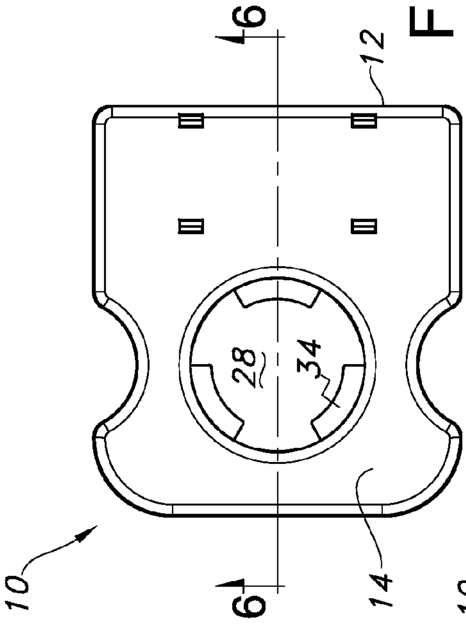
FIG. 3 is a top plan view of the EAS integrated faucet tag assembly shown in FIG. 1.
Figure 4:
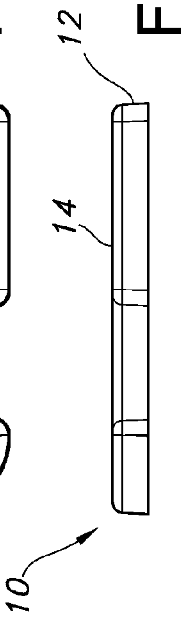
FIG. 4 is a side view of the EAS integrated faucet tag assembly shown in FIG. 1.
Figure 5:
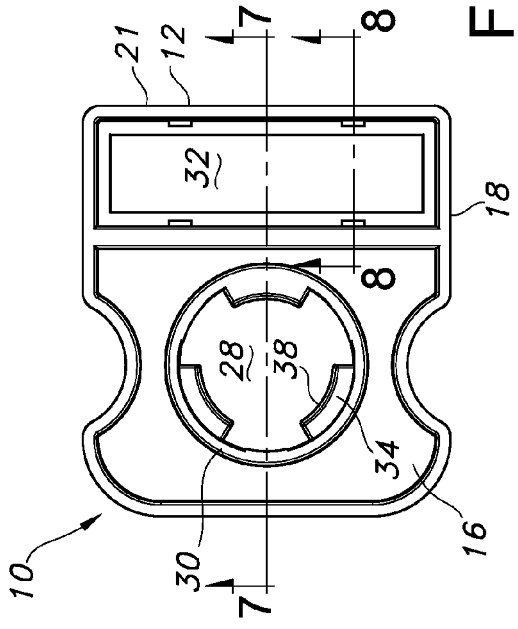
FIG. 5 is a bottom plan view of the EAS integrated faucet tag assembly shown in FIG. 1.

FIGS. 3-5 show a top, side and bottom view of the housing 12 for the tag assembly 10. FIG. 6 is a sectional view from FIG. 3 for section A-A and FIG. 7 is a sectional view from FIG. 5 for section B-B. FIGS. 6 and 7 show the opening 28 in the housing 12 formed by the inner perimetrical side wall 30. The flexible members 34 extend into the opening 28 from the inner perimetrical side wall 30 and the compartment 32 is formed in the second section 26. FIG. 8 is a sectional view from FIG. 5 for section C-C and shows the second section 26 formed by internal wall 22 and one of the end walls 21 of the outer perimetrical side wall 18.

Figure 10:
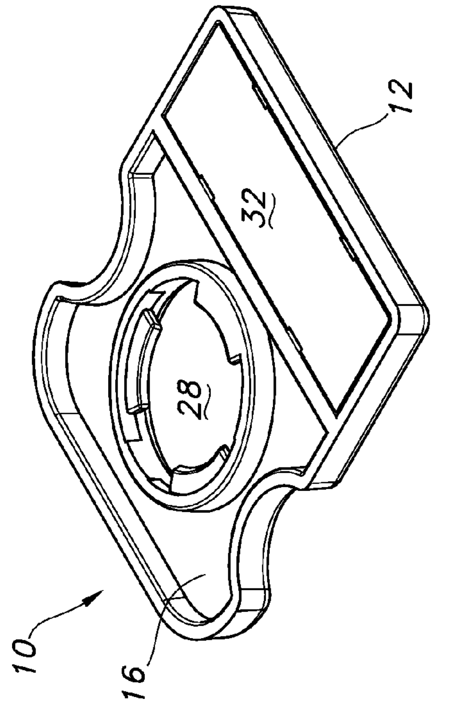
FIG. 10 is a bottom perspective view of the EAS integrated faucet tag assembly shown in FIG. 9.
Figure 11:
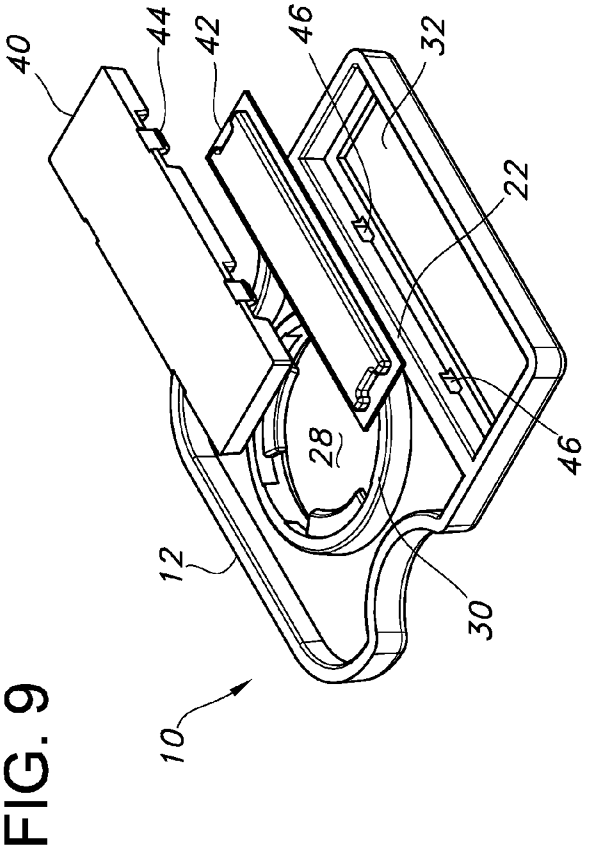
FIG. 11 is an exploded view of the EAS integrated faucet tag assembly of the present invention showing a bottom perspective view of the housing, the EAS tag and the cover for the EAS compartment.
Figure 9:
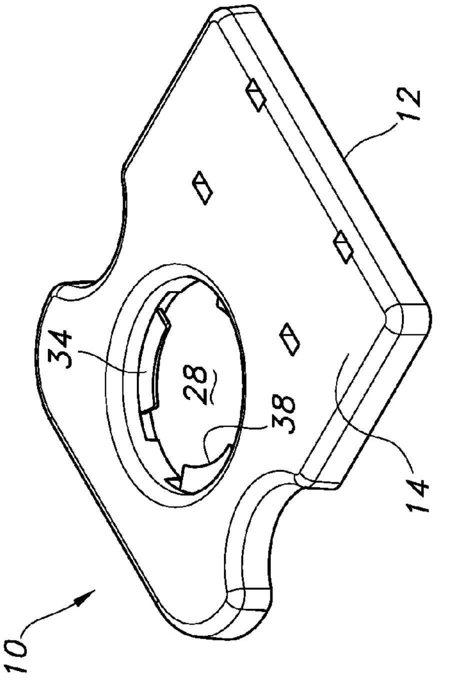
FIG. 9 is a top perspective view of the EAS integrated faucet tag assembly of the present invention.
Figure 13:
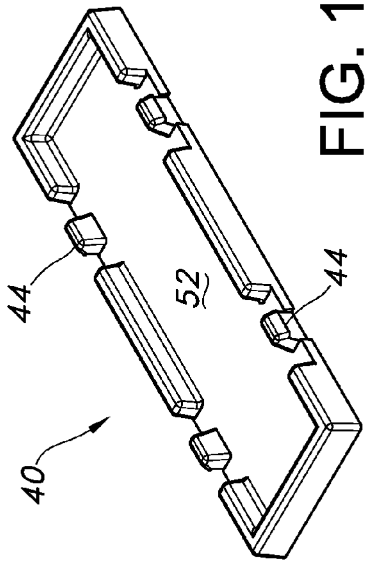
FIG. 13 is a bottom perspective view of the cover for the EAS compartment shown in FIG. 11.
Figure 17:
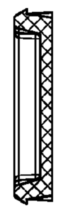
FIG. 17 is a cross-sectional view of section D-D of the cover for the EAS compartment shown in FIG. 16.
Figure 16:
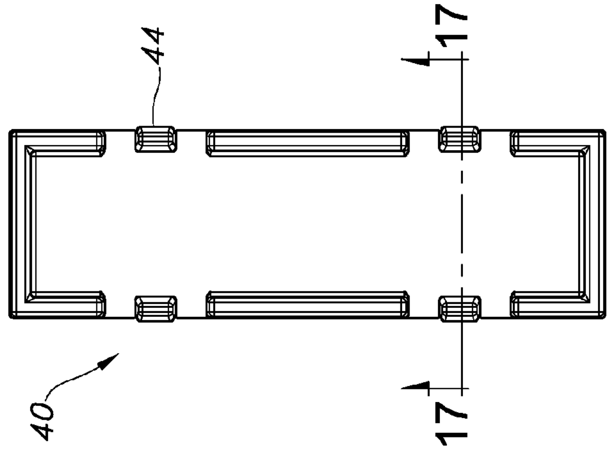
FIG. 16 is a bottom plan view of the cover for the EAS compartment shown in FIG. 11.
Figure 12:
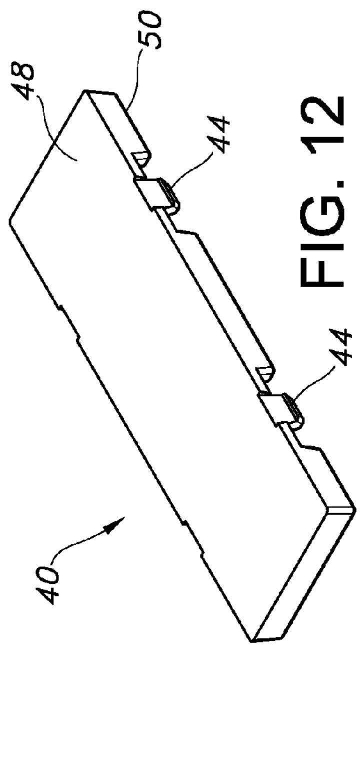
FIG. 12 is a top perspective view of the cover for the EAS compartment shown in FIG. 11.
Figure 15:
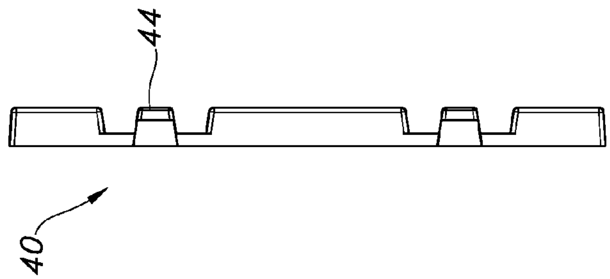
FIG. 15 is a side view of the cover for the EAS compartment shown in FIG. 11.
Figure 14:
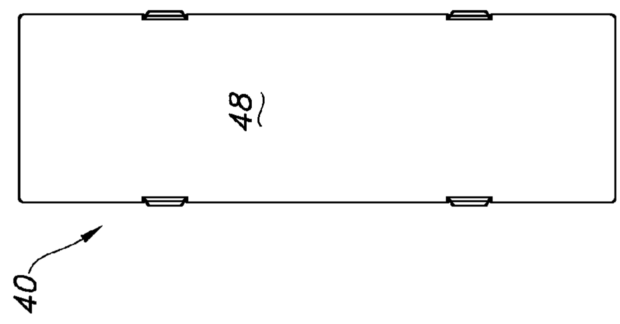
FIG. 14 is a top plan view of the cover for the EAS compartment shown in FIG. 11.

FIGS. 9 and 10, which are similar to FIGS. 1 and 2, show top and bottom sides 14, 16 of the housing 12. FIG. 11 is an exploded view of the bottom side 16 and it shows how the cover 40 fits over the compartment 32 in the second section 26 to enclose an EAS device 42. The cover 40 has flexible mounting clips 44 which engage mating devices 46 on the internal wall 22 and the interior side of the outer perimetrical side wall 18. FIG. 11 shows the mating devices 46 as notches. However, other types of mating devices 46 well know in the art can also be used. After the cover 40 is attached to the housing 12, the EAS device 42 is secured in the compartment 32, where it is protected from damage and tampering.

FIGS. 12-17 show the cover 40 in more detail. The cover 40 is preferably rectangular in shape and has a substantially flat top wall 48 and a perimetrical side wall 50 that extends downwardly from the perimeter of the top wall 48 on all four sides. Two flexible mounting clips 44 are formed in opposing sides of the perimetrical side wall 50 and are used to secure the cover 40 to the housing 12. The top wall 48 and the perimetrical side wall 50 of the cover 40 define an interior space 52 that encloses the compartment 32 in the second section 26 in which the EAS device 42 can be placed.

FIGS. 18-20 show the tag assembly 10 used in the packaging for a faucet 90. The two pipes 92 of the faucet 90 extend through a wall 98 (e.g., a piece of cardboard) and the tag assembly 10 is threaded onto one of the pipes 92 until it contacts the wall 98. A nut 96 can also be threaded onto the pipe 92 to further secure the tag assembly 10 to the faucet 90. The figures show the tag assembly 10 installed on the faucet 90 so that the bottom side 16 of the housing 12 is facing the faucet 90. In this configuration, the EAS device 42 cannot be accessed without removing the tag assembly 10 from the faucet 90. This makes it more difficult for a potential thief to tamper with or remove the EAS device 42 from the housing 12.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. An electronic article surveillance ("EAS") integrated faucet tag assembly for attachment to a threaded pipe on a faucet, the tag assembly comprising:

a housing comprising a base plate, an internal wall and an outer perimetrical side wall, wherein the base plate has a top side, a bottom side and a perimeter, and wherein the outer perimetrical side wall extends from the perimeter of the bottom side to define an enclosed area with an open side;

a first section and a second section of the bottom side of the base plate separated by the internal wall, wherein the first section has an opening in the base plate defined by an inner perimetrical side wall extending from the bottom side to a perimetrical edge, and wherein the second section has a compartment bounded by the internal wall and the outer perimetrical side wall;

one or more members extending into the opening from the inner perimetrical side wall;

a cover, wherein the cover has a closed position that encloses the compartment and an open position that allows access to the compartment; and an electronic article surveillance tag located in the compartment, wherein the threaded pipe is inserted in the opening from the bottom side and the one or more members engage the threads to secure the tag assembly to the faucet.

2. The EAS integrated faucet tag assembly according to claim 1, wherein each of the one or more members has a base located on the inner perimetrical side wall and a distal end which engages the threads of the pipe.

3. The EAS integrated faucet tag assembly according to claim 2, wherein the one or more members are flexible, and wherein the base of each flexible member has a first thickness and the distal end of each flexible member has a second thickness, and wherein the first thickness is greater than the second thickness.

4. The EAS integrated faucet tag assembly according to claim 1, wherein the distal end is arcuate.

5. The EAS integrated faucet tag assembly according to claim 1, wherein the cover comprises a substantially flat top wall with a perimeter and a perimetrical side wall extending therefrom.

6. The EAS integrated faucet tag assembly according to claim 5, wherein the cover further comprises one or more flexible mounting clips located on the perimeter of the top wall or on the perimetrical side wall, wherein the internal wall and/or the outer perimetrical side wall comprise one or more mating devices, and wherein the one or more flexible mounting clips engage the one or more mating devices to secure the cover to the housing.

7. The EAS integrated faucet tag assembly according to claim 1, wherein the one or more members are flexible.

8. The EAS integrated faucet tag assembly according to claim 1, wherein the outer perimetrical side wall comprises two side walls and two end walls, and wherein the internal wall is substantially parallel to one of the two end walls.

9. The EAS integrated faucet tag assembly according to claim 8, wherein a portion of each side wall bounding the first section is concave.

10. The EAS integrated faucet tag assembly according to claim 1, wherein the tag is constructed from a plastic material.

11. The EAS integrated faucet tag assembly according to claim 10, wherein, the tag is constructed form polypropylene, polyethylene or polyvinyl chloride.

12. The EAS integrated faucet tag assembly according to claim 1, wherein the opening in the base plate is substantially round or substantially oval in shape.

13. An electronic article surveillance ("EAS") integrated faucet tag assembly for attachment to a threaded pipe on a faucet, the tag assembly comprising:

a housing comprising a base plate, an internal wall and an outer perimetrical side wall, wherein the base plate has a top side, a bottom side and a perimeter, and wherein the outer perimetrical side wall extends from the perimeter of the bottom side to define an enclosed area with an open side;

a first section and a second section of the bottom side of the base plate separated by the internal wall, wherein the first section has a substantially round or substantially oval opening in the base plate defined by an inner perimetrical side wall extending from the bottom side to a perimetrical edge, and wherein the second section has a compartment bounded by the internal wall and the outer perimetrical side wall;

one or more flexible members extending into the opening from the inner perimetrical side wall, wherein each of the one or more members has a base located on the inner perimetrical side wall and an arcuate distal end;

a cover comprising a substantially flat top wall with a perimeter and a perimetrical side wall extending therefrom, wherein the cover has a closed position that encloses the compartment and an open position that allows access to the compartment; and an electronic article surveillance tag located in the compartment, wherein the threaded pipe is inserted in the opening from the bottom side and the arcuate distal ends of the one or more flexible members engage the threads to secure the tag assembly to the faucet.

14. The EAS integrated faucet tag assembly according to claim 13, wherein the base of the flexible member has a first thickness and the distal end of the flexible member has a second thickness, and wherein the first thickness is greater than the second thickness.

15. The EAS integrated faucet tag assembly according to claim 13, wherein the cover further comprises one or more flexible mounting clips located on the perimeter of the top wall or on the perimetrical side wall, wherein the internal wall and/or the outer perimetrical side wall comprise one or more mating devices, and wherein the one or more flexible mounting clips engage the one or more mating devices to secure the cover to the housing.

16. The EAS integrated faucet tag assembly according to claim 1, wherein the outer perimetrical side wall comprises two side walls and two end walls, wherein the internal wall is substantially parallel to at least one of the two end walls, and wherein a portion of each side wall bounding the first section is concave.

17. The EAS integrated faucet tag assembly according to claim 1, wherein the tag is constructed from polypropylene, polyethylene or polyvinyl chloride.

18. An electronic article surveillance ("EAS") integrated faucet tag assembly for attachment to a threaded pipe on a faucet, the tag assembly comprising:

a housing comprising a base plate, an internal wall and an outer perimetrical side wall, wherein the base plate has a top side, a bottom side and a perimeter, wherein the internal wall is substantially parallel to the two end walls, and wherein the outer perimetrical side wall extends from the perimeter of the bottom side to define an enclosed area with an open side;

a first section and a second section of the bottom side of the base plate separated by the internal wall, wherein the first section has a substantially round or substantially oval opening in the base plate defined by an inner perimetrical side wall extending from the bottom side to a perimetrical edge, wherein the perimetrical side wall bounding the first section has one or more concave portions, wherein the second section has a compartment bounded by the internal wall and the outer perimetrical side wall, and wherein the internal wall and/or the outer perimetrical side wall around the compartment comprise one or more mating devices;

one or more flexible members extending into the opening from the inner perimetrical side wall, wherein each of the one or more flexible members has a base located on the inner perimetrical side wall and a distal end;

a cover that encloses the compartment and comprises one or more flexible mounting clips that engage the one or more mating devices to secure the cover to the housing; and an electronic article surveillance tag located in the compartment, wherein the threaded pipe is inserted in the opening from the bottom side and the distal ends of the one or more flexible members engage the threads to secure the tag assembly to the faucet.

19. The EAS integrated faucet tag assembly according to claim 18, wherein the base of each of the one or more flexible members has a first thickness and the distal end has a second thickness, and wherein the first thickness is greater than the second thickness.

20. The EAS integrated faucet tag assembly according to claim 19, wherein the tag is constructed from polypropylene, polyethylene or polyvinyl chloride.

* * * * *